United States Patent
Jacobsen

(10) Patent No.: US 7,916,312 B2
(45) Date of Patent: Mar. 29, 2011

(54) MEASURING DEVICE FOR MEASURING A DISTANCE

(75) Inventor: Hans Jacobsen, Taby (SE)

(73) Assignee: Haglof Sweden AB, Langsele (SE)

( * ) Notice: Subject to any disclaimer, the term of this patent is extended or adjusted under 35 U.S.C. 154(b) by 33 days.

(21) Appl. No.: 12/530,809

(22) PCT Filed: Feb. 20, 2008

(86) PCT No.: PCT/SE2008/050200
§ 371 (c)(1),
(2), (4) Date: Sep. 11, 2009

(87) PCT Pub. No.: WO2008/111898
PCT Pub. Date: Sep. 18, 2008

(65) Prior Publication Data
US 2010/0053640 A1    Mar. 4, 2010

(30) Foreign Application Priority Data
Mar. 13, 2007  (SE) ...................... 0700613

(51) Int. Cl.
*G01B 11/02* (2006.01)
(52) U.S. Cl. .......................................... 356/635; 33/503
(58) Field of Classification Search .......... 356/625–640; 33/503, 783–784, 787–788
See application file for complete search history.

(56) References Cited

U.S. PATENT DOCUMENTS

| 2005/0005467 A1* | 1/2005 | Hannel | 33/542 |
| 2005/0028398 A1* | 2/2005 | Jacobsen | 33/784 |
| 2010/0250178 A1* | 9/2010 | Noda et al. | 702/95 |

FOREIGN PATENT DOCUMENTS

| DE | 42 41 335 | 2/1994 |
| DE | 101 12 222 | 9/2002 |
| WO | 90/04752 | 5/1990 |

OTHER PUBLICATIONS

International Search Report dated May 1, 2008, from corresponding PCT application.

* cited by examiner

*Primary Examiner* — Hoa Q Pham
(74) *Attorney, Agent, or Firm* — Young & Thompson

(57) ABSTRACT

A measurement arrangement has a rotation axis around a first end of an extended member having a first joint thereat, and a second joint at the opposing end. An equipment for recording measured points is connected to the second joint. The joints are connected through a cord or wire. The equipment is arranged to rotate through a pre-determined angle when the member is turned around its rotation axis. An angle sensor records the rotation of the equipment relative to the member. The cord or wire rotates the equipment through an angle corresponding to the angle that the member has rotated around its rotation axis. The equipment and the member rotate in opposite directions, and the angles of rotation are recorded when the equipment detects the limiting surface of the object on both sides of the diameter to be measured. A processor calculates the diameter based on the angles of rotation.

17 Claims, 4 Drawing Sheets

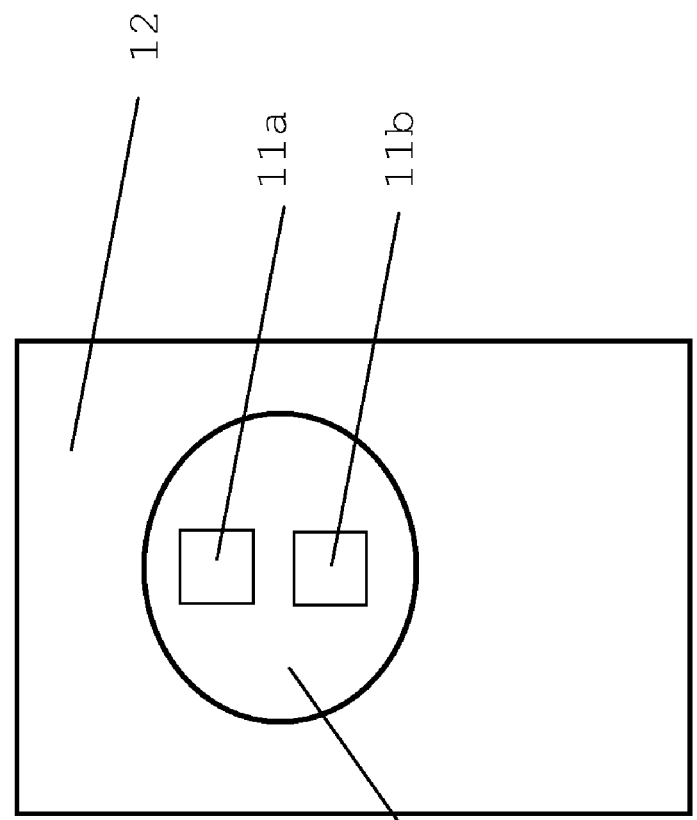

MEASURING DEVICE FOR MEASURING A DISTANCE

The present invention relates to a measurement arrangement for measuring a distance, to be more precise, for measuring a diameter. It concerns, in particular, the measurement of the diameter of a tree.

A caliper of known type for the measurement of the diameter of a tree has a rule along which it is possible to displace a cursor. A shank is attached not only at the first end of the fixed scale, which is also one end of the rule, but also at the displaceable cursor, and measurement takes place between these shanks. The measurement is indicated as the position of the cursor along the rule. Such calipers are known.

Electronic calipers are also known, in which the said position is indicated and stored electronically, and where the measured value is presented on a display on, for example, the cursor. Calipers are also known in which keys are available by the means of which the operator can input information about the species of tree. This information is thereby stored in a memory that belongs to the caliper together with the relevant value of diameter.

Since the diameters of the trunks of certain species of tree are large, calipers are required that have rules that can be approximately 1-1.5 m, and shanks that can be between approximately 0.5 m and 1.0 m. One problem with known calipers is that they are awkward and difficult to transport, and difficult to carry during the taking of the inventory.

There is, furthermore, available a caliper in which the first shank can be folded in the said plane, and is attached at a fixture on the rule such that it can pivot, and where the second shank can be folded in the said plane and is attached to the cursor such that it can pivot. The first shank is provided with a first attachment means arranged to hook into the said fixture, and the second shank is provided with a second attachment means arranged to hook into the cursor.

One first problem with known calipers is that they are long, large and relatively heavy. A person who takes an inventory in a forest normally measures approximately 2000-2500 trees during one day. These persons are thereby exposed to a serious risk of suffering strain injury of, for example, hands, wrists, arms and shoulders, since the calipers weigh as much as just over 1 kg, and since the calipers furthermore have an awkward shape.

A second problem is that two hands are required during the measurement of the diameter of a tree using calipers of known type, and this makes it more difficult to carry out other tasks in parallel with the measurement of the diameter. One example of a task that is to be carried out in parallel may be the marking of the tree whose diameter has been measured. A second example is that of recording the measurements manually or digitally. Certain personnel mark the tree whose diameter has been measured by chopping it with an axe. In addition to this, there is no opportunity to use one hand while the other hand is resting from work, in order later to change hands.

The present invention solves the problems described above.

The present invention thus relates to a measurement arrangement for the measurement of a diameter or a width of an object, and it is characterised in that a first joint is arranged at a first end of an extended member around which first end the measurement arrangement has a rotation axis, in that a second joint is arranged at the opposing end of the extended member, in that an equipment for recording measured points is arranged at the second joint and is connected to it, in that the first joint and the second joint are connected through a cord or wire, in that the equipment for recording measured points is arranged to be rotated through a pre-determined angle when the extended member is turned around its rotation axis, in that an angle sensor is arranged at one of the joints in order to record a rotation of the equipment for recording measured points relative to the extended member, in that the equipment for recording measured points is arranged to be rotated by means of the cord or wire through an angle that corresponds to the angle that the extended member has been turned around its rotation axis, in that the equipment for recording measured points and the extended member are arranged to be rotated in opposite directions, in that the angles of rotation are recorded when the equipment for recording measured points detects the limiting surface of the object on both sides of the diameter that is to be measured, and in that a processor calculates the diameter based on the said angles of rotation.

The invention is described in more detail below, partially in association with embodiments shown on the attached drawings, in which:

FIG. 4 shows a schematic view, along the arrow A in FIG. 2, of a housing with a hole, with a light-emitting laser and a laser detector.

The present invention relates to a measurement arrangement 1 for the measurement of a diameter d or a width of an object.

Figure 1:
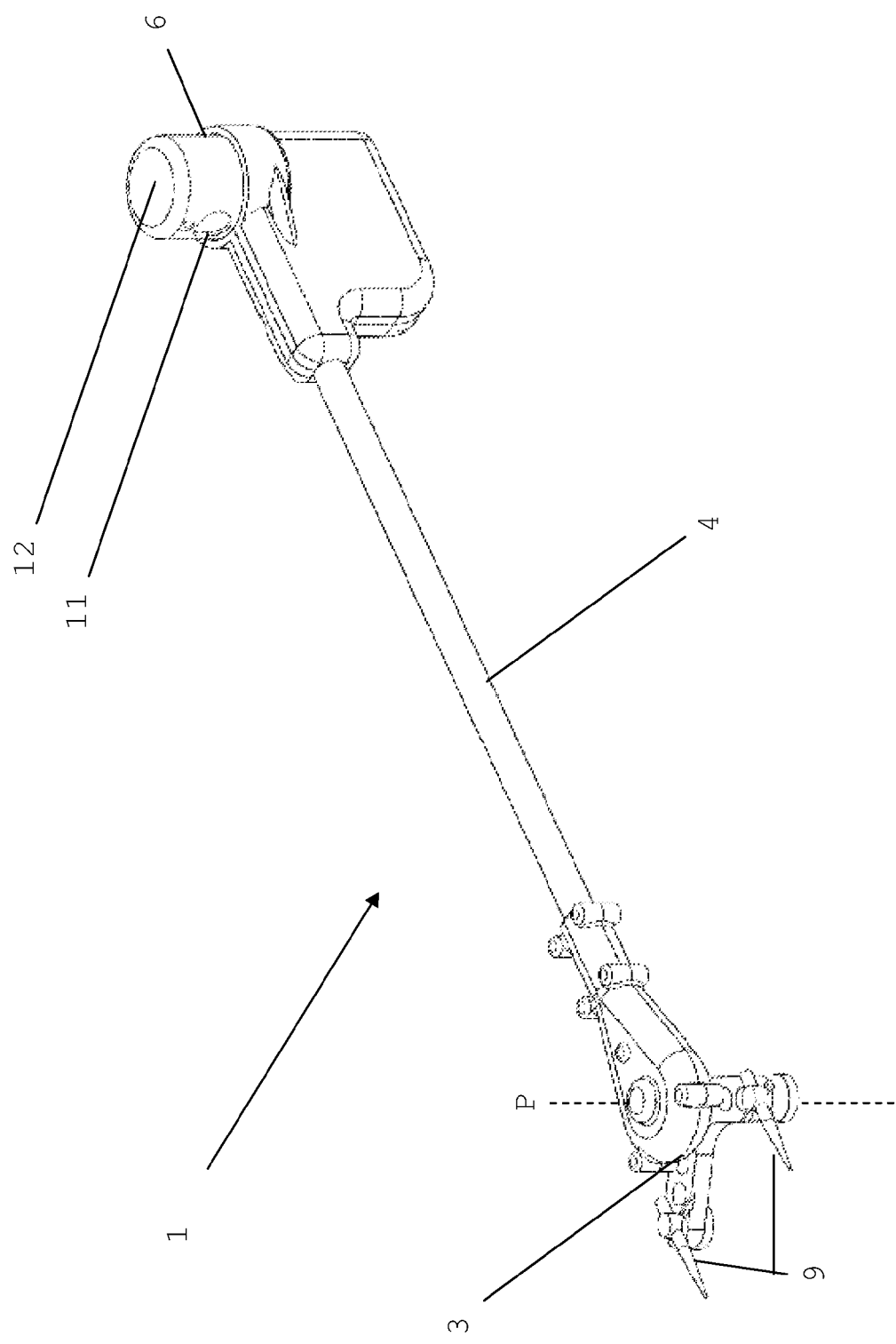
FIG. 1 shows schematically a measurement arrangement obliquely from the side.
Figure 2:
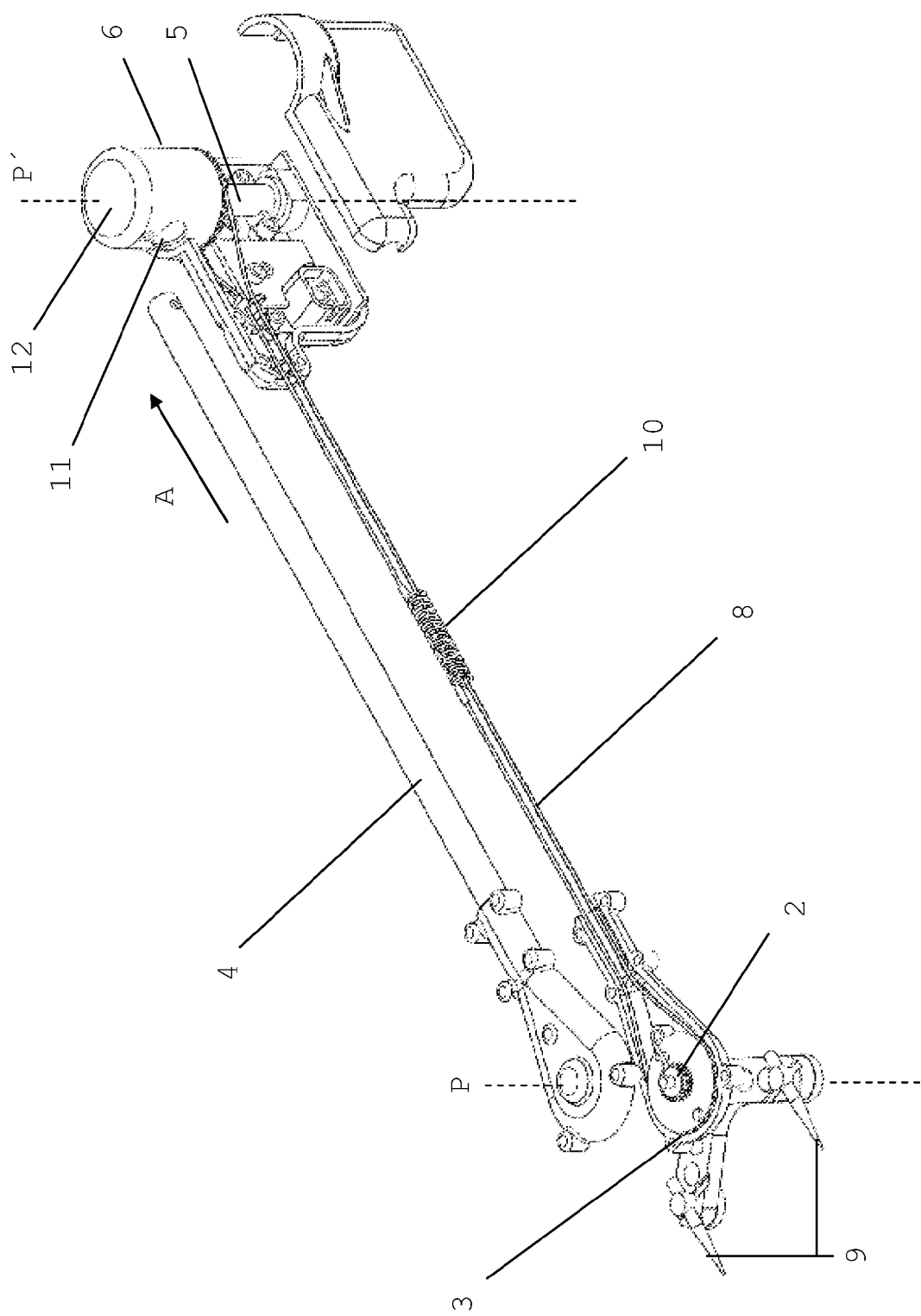
FIG. 2 shows an exploded view of a measurement arrangement according to FIG. 1.

FIGS. 1 and 2 show a measurement arrangement 1 according to the invention with a first joint 2 arranged at a first end 3 of an extended member 4, around which first end 3 the measurement arrangement 1 has a rotation axis P. A second joint 5 is arranged at the opposing end 6 of the extended member 4, with a rotation axis P'. Equipment 11 for recording measured points is arranged at the second joint 5 and connected to it, while the first joint 2 and the second joint 5 are connected through a cord 8 or a wire. The equipment 11 for recording measured points is arranged to be rotated through a pre-determined angle when the extended member 4 is turned around its rotation axis P. An angle sensor is arranged at one of the joints in order to record a rotation of the equipment 11 for recording measured points relative to the extended member 4. The equipment 11 for recording measured points is arranged to be rotated by means of the cord 8 or wire through an angle that corresponds to the angle that the extended member 4 has been turned around its rotation axis P. The equipment 11 for recording measured points and the extended member 4 are arranged to be rotated in opposite directions around the rotation axis P'. The angles of rotation are recorded when the equipment 11 for recording measured points detects the limiting surface of the object on both sides of the diameter that is to be measured, and a processor is arranged to calculate the diameter based on the said angles of rotation.

The cord 8 or wire is an example of an extended material that extends between the first joint 2 and the second joint 5 and that connects these.

The angle sensor is of known type. The selection of angle sensor depends on the change of angle that the measurement arrangement 1 undergoes between two recording operations of measurement points Mh, Mv. If a long measurement arrangement 1, for example, measures the diameter of a narrow tree, the change of angle between two recording operations for measurement points Mh, Mv will not be sufficiently large to obtain a reliable change in angle compared to the case in which a shorter measurement arrangement 1 is used, and thus a reliably measured diameter would not be obtained from the change in angle. The price of an angle sensor, however, depends on the resolution of the angle sensor. It is preferable that the angle sensor have 12-bits resolution in order to measure the diameters of trees that are normally found, and the extended member 4 is approximately between 20 and 50 cm long.

Figure 3:
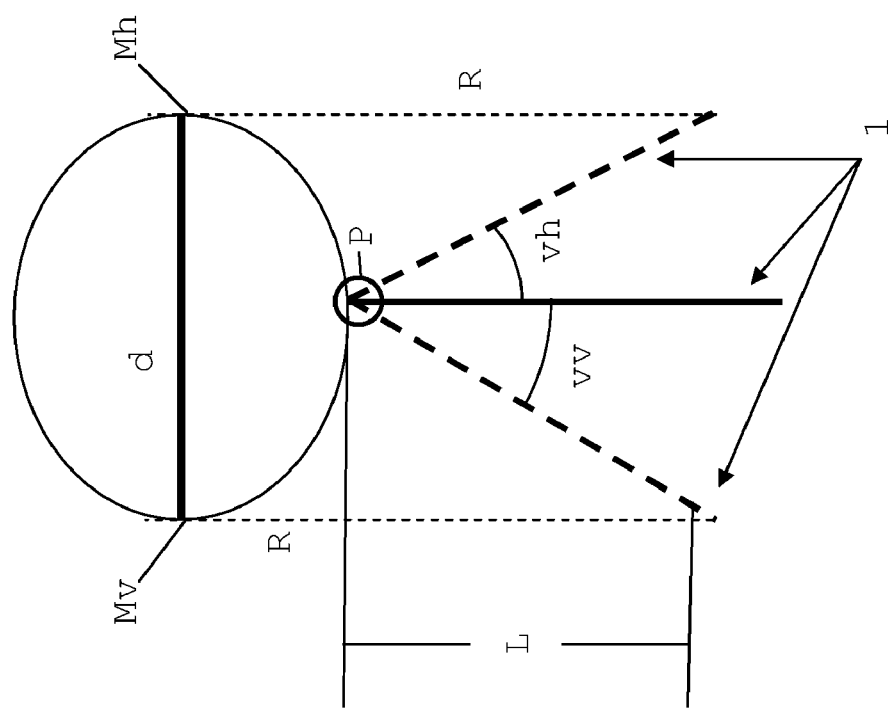
FIG. 3 shows schematically how a measurement arrangement is used to measure a diameter of an object.

FIG. 3 shows that, according to one embodiment, the directions R of the optical axis of the equipment 11 for recording measured points are mutually parallel at different angles of rotation. It will thus be possible to measure also a diameter d of an object with a circular cross-section since the direction R of the axis reaches a measurement point Mh, Mv on the object that corresponds to the diameter d of the object. In this way, the diameter d of the object will be measured in a correct manner.

The angle sensor is of known type.

The reference point of the angle sensor is, according to one preferred embodiment, fixed. The measurement arrangement 1 is arranged to measure the diameter d through a reference value being set to zero when, for example, the joint 2 is at its return sprung position. This position is known as "home" below. The arrangement 1 is arranged thereafter to be driven in a first direction until the equipment for recording measured points reaches the first measurement point Mh, and an angle vh is recorded. The arrangement 1 is thereafter arranged to be driven to the second measurement point Mv. The diameter d is subsequently calculated, based on the recorded values at the two measurement points Mh, Mv, according to the following equation:

$$d = L \sin(vh) + L \sin(vv)$$

where L is the distance between P and P'.

An activation means is present according to one preferred embodiment in order to read the angle of rotation of the equipment for recording measured points. A user can in this way choose to carry out the recording operation manually for a measurement point Mh, Mv if, for example, the automatic recording of a measurement point Mh, Mv does not function due to the surroundings around the object whose diameter d is to be measured making the automatic recording difficult, or preventing it. It is preferable that the activation means be located at a position along the measurement arrangement 1 at which the user holds the measurement arrangement 1 when it is being used.

A common occasion on which such a manual measurement of the diameter d of a tree may be required is the case in which trees have been felled and are lying next to each other.

According to one preferred embodiment, the equipment 11 for recording measured points comprises a laser and a detector.

According to one embodiment, the equipment 11 for recording measured points is arranged to record the measurement points Mh, Mv automatically, based on the transition between reflected laser and non-reflected laser light. The reflected light increases markedly, for example, when the laser illuminates the tree trunk, above the level it has when the laser beam of the laser passes outside of the tree trunk.

According to a further preferred embodiment, the equipment 11 for recording measured points comprises a digital camera unit with automatic gain control (AGC).

According to a further preferred embodiment, the camera unit with AGC is connected to an image processing program in order to detect the transition between the object and its surroundings. The camera with AGC is in this case programmed such that detection takes place when the edge of the tree trunk is positioned centrally in the image.

According to one preferred embodiment, a contact unit 9 is arranged at the first end 3 in order to make contact with an object, the diameter d of which is to be measured.

According to a further preferred embodiment, the contact unit 9 is provided with at least one peg arranged to make contact with the object while a measurement is being carried out, whereby the measurement arrangement 1 is held firmly in contact with the object. The measurement arrangement 1 is in this way held in place against the object that is to be measured, and a reliable angular positioning of the measurement arrangement 1 in a horizontal direction around the rotation axis P can be carried out by a user.

According to a further preferred embodiment, a vertical support is arranged at the first end 3, which support is arranged to be placed onto a supporting surface, whereby the measurement arrangement 1 is held firmly without the measurement arrangement 1 being in contact with the object that is to be measured. The contact unit 9 in FIGS. 1 and 2, comprising the peg, can be, for example, exchanged for a support.

According to a further preferred embodiment, the extended member 4 is a tube, and is manufactured from a light material, such as carbon fibre. The user can in this way use the measurement arrangement 1 without causing strain injury of hands, wrists, arms or shoulders. It is also possible for the user to use the measurement arrangement 1 with one hand. The typical weight of the arrangement 1 is 100-150 g.

According to a further preferred embodiment, the cord 8 or wire is attached at the rotating parts of the first joint 2 and the second joint 5. When the measurement arrangement 1 is displaced in a horizontal plane around the rotation axis P, the first joint 2 and the second joint 5 are rotated, and since the cord 8 or wire is attached at the joints 2, 5, then both the first joint 2 and the second joint 5 will follow the rotation, and rotate in opposite directions. The equipment 11 for recording measured points, which is located on the second joint 5, will also in this way rotate.

According to a further preferred embodiment, a tensioning means 10 is located along the cord 8 or wire in the tube, whereby the cord 8 or wire is maintained in an extended condition. When the cord 8 or wire is maintained in an extended condition, this entails both the first joint 2 and the second joint 5 starting to rotate at the same time, and it is for this reason that the changes in angle vh, vv will start to be recorded as soon as the measurement arrangement 1 is displaced in a horizontal direction around the rotation axis P.

According to a further preferred embodiment, the measurement arrangement 1 is arranged to measure the diameter d of trees. This light and easy to use measurement arrangement 1 is well suited to be carried into the forest when taking an inventory of tree diameters.

According to a further preferred embodiment, the extended member 4 is arranged such that it has a length sufficient to be able to measure the diameters of trees, the length of the member 4 being, for example, 10-100 cm. The diameters of trees are, however, normally less than 50 cm.

FIG. 4 shows, according to one preferred embodiment, a view along the arrow A in FIG. 2. A housing 12 with a hole 13 in it is located at the second end 6. A light-emitting laser 11*a* and a laser detector 11*b* are located inside the housing 12, placed one above the other in a vertical direction and visible through the hole 13. A correct measurement of the diameter d of the object that is to be measured is in this way obtained.

The measurement arrangement 1 is used by a contact unit 9 being caused to approach a tree trunk such that the contact unit 9 is in stable contact with the trunk. Starting at the home position, when the joint 2 is at its return sprung position, the measurement arrangement 1 is rotated from this position. The measurement arrangement 1 is subsequently rotated around the relevant rotation axes P, P', whereby the first joint 2 and the second joint 5 rotate in opposite directions. A laser 11a, for example, that is connected with the second joint 5, is rotated such that the laser beam is displaced in a parallel direction. When the measurement arrangement 1 has been rotated such that the laser beam reaches a measurement point Mh at the edge of the trunk, a recording operation for the first angle vh takes place. The angle sensor calculates the distance between the measurement point Mh and the home position. The measurement arrangement 1 is subsequently rotated in the opposite direction around the relevant rotation axes P, P' until the laser beam reaches a second measurement point Mv at the opposite edge of the trunk. When the laser beam reaches the opposite edge of the trunk, a second angle vv between the home position and the recording operation at Mv has been recorded, and the angle sensor converts the angles vh, vv that have been measured into a diameter d of the tree, given the distance L between the laser on the measurement arrangement 1 and the rotation axis P. The diameter d that has been calculated is transmitted to a portable computer that is placed on the measurement arrangement 1 in order to store the recorded value of the diameter d, according to a program in the portable computer.

A number of embodiments and uses have been described above. The measurement arrangement 1 comprising the first joint 2 and the second joint 5, the extended member 4, the angle sensor and the equipment 11 for recording measured points can, however, be designed in another suitable manner without deviating from the fundamental concept of the invention.

Thus, the present invention is not limited to the embodiments described above since it can be varied within the scope specified by the attached patent claims.

The invention claimed is:

1. A measurement arrangement (1) for the measurement of a diameter or a width of an object, characterized in that a first joint (2) is arranged at a first end (3) of an extended member (4), around which first end (3) the measurement arrangement (1) has a rotation axis (P), in that a second joint (5) is arranged at the opposing end (6) of the extended member (4), in that an equipment (11) for recording measured points is arranged at the second joint (5) and connected to it, in that the first joint (2) and the second joint (5) are connected through a cord (8) or a wire, in that the equipment (11) for recording measured points is arranged to be rotated through a pre-determined angle when the extended member (4) is turned around its rotation axis (P), in that an angle sensor is arranged at one of the joints in order to record a rotation of the equipment (11) for recording measured points relative to the extended member (4), in that the equipment (11) for recording measured points is arranged to be rotated by means of the cord (8) or wire through an angle that corresponds to the angle that the extended member (4) has been turned around its rotation axis (P), in that the equipment (11) for recording measured points and the extended member (4) are arranged to be rotated in opposite directions, in that the angles of rotation are recorded when the equipment (11) for recording measured points detects the limiting surface of the object on both sides of the diameter that is to be measured, and in that a processor is arranged to calculate the diameter based on the said angles of rotation.

2. A measurement arrangement according to claim 1, characterized in that the directions (R) of the optical axis of the detector are mutually parallel at different angles of rotation.

3. A measurement arrangement according to claim 2, characterized in that an activation means is present in order to read the angle of rotation of the equipment (11) for recording measured points.

4. A measurement arrangement according to claim 2, characterized in that the equipment (11) for recording measured points is arranged to record the measurement points (Mh, Mv) based on the transition between reflected and non-reflected laser light.

5. A measurement arrangement according to claim 2, characterized in that the equipment (11) for recording measured points is a digital camera unit.

6. A measurement arrangement according to claim 1, characterized in that an activation means is present in order to read the angle of rotation of the equipment (11) for recording measured points.

7. A measurement arrangement according to claim 6, characterized in that the equipment (11) for recording measured points is arranged to record the measurement points (Mh, Mv) based on the transition between reflected and non-reflected laser light.

8. A measurement arrangement according to claim 6, characterized in that the equipment (11) for recording measured points is a digital camera unit.

9. A measurement arrangement according to claim 1, characterized in that the equipment (11) for recording measured points is arranged to record the measurement points (Mh, Mv) based on the transition between reflected and non-reflected laser light.

10. A measurement arrangement according to claim 1, characterized in that the equipment (11) for recording measured points is a digital camera unit.

11. A measurement arrangement according to claim 10, characterized in that the camera unit with AGC is connected to an image processing program in order to record the transition between the object and its surroundings.

12. A measurement arrangement according to claim 1, characterized in that a contact unit (9) is arranged at the first end (3) in order to make contact with an object whose diameter (d) is to be measured.

13. A measurement arrangement according to claim 12, characterized in that the contact unit (9) is provided with at least one peg arranged to make contact with the object while a measurement is being carried out, whereby the measurement arrangement (1) is held firmly in contact with the object.

14. measurement arrangement according to claim 1, characterized in that a vertical support is arranged at the first end (3), which support is arranged to be placed onto a supporting surface, whereby the measurement arrangement (1) is held firmly without the measurement arrangement (1) being in contact with the object that is to be measured.

15. A measurement arrangement according to claim 1, characterized in that the cord (8) or wire is attached to the part that can be rotated of the first joint (2) and the second joint (5).

16. A measurement arrangement according to claim 1, characterized in that a tensioning means (10) is located along the cord (8) or wire in a tube, whereby the cord (8) or wire is held in an extended condition.

17. A measurement arrangement according to claim 1, characterized in that the extended member (4) is arranged with a length that is sufficient to be able to measure the diameters (d) of trees, such as 10-200 cm.

* * * * *